United States Patent
Rao et al.

(10) Patent No.: US 6,408,804 B1
(45) Date of Patent: *Jun. 25, 2002

(54) APPARATUS FOR VARYING THE COMPRESSION RATIO OF AN INTERNAL COMBUSTION ENGINE

(75) Inventors: V. Durga Nageswar Rao, Bloomfield Hills; Mark Michael Madin, Canton; Yash Andrew Imai, Troy, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/691,666

(22) Filed: Oct. 18, 2000

(51) Int. Cl.$^7$ ................................................. F02B 75/04
(52) U.S. Cl. ..................................................... 123/48 B
(58) Field of Search ....................................... 123/48 B

(56) References Cited

U.S. PATENT DOCUMENTS

| | | |
|---|---|---|
| 2,134,995 A | 11/1938 | Anderson |
| 4,084,553 A | 4/1978 | Forde et al. |
| 4,241,705 A | 12/1980 | Karaba et al. |
| 4,246,873 A | 1/1981 | Lih-Liaw |
| 4,286,552 A | 9/1981 | Tsutsumi |
| 4,370,901 A | 2/1983 | Bolen |
| 4,934,347 A | 6/1990 | Suga et al. |
| 4,957,069 A * | 9/1990 | Mederer ................ 123/48 B |
| 4,974,554 A * | 12/1990 | Emery .................. 123/48 B |
| 5,146,879 A * | 9/1992 | Kume et al. ........... 123/48 B |
| 5,417,185 A | 5/1995 | Beattie |
| 5,562,068 A | 10/1996 | Sugimoto et al. |
| 5,724,863 A | 3/1998 | Kramer |
| 5,865,092 A | 2/1999 | Woudwyk |
| 5,960,750 A | 10/1999 | Kreuter |
| 6,223,703 B1 * | 5/2001 | Galvin .................. 123/48 B |

FOREIGN PATENT DOCUMENTS

JP        03092552 A    4/1991

* cited by examiner

Primary Examiner—Marguerite McMahon
Assistant Examiner—Jason Benton
(74) Attorney, Agent, or Firm—Carlos L. Hanze

(57) ABSTRACT

An apparatus for selectively varying a compression ratio of an internal combustion engine includes a bearing retainer disposed between a connecting rod and a crankpin of an internal combustion engine, the bearing retainer having an inner surface in communication with the crankpin and an outer surface in communication with the connecting rod, the connecting rod being axially movable relative to the bearing retainer along a longitudinal axis of the connecting rod to effect a selective displacement of the connecting rod relative to the bearing retainer, the displacement thereby causing a change in the effective length of the connecting rod and the compression ratio of the internal combustion engine.

14 Claims, 12 Drawing Sheets

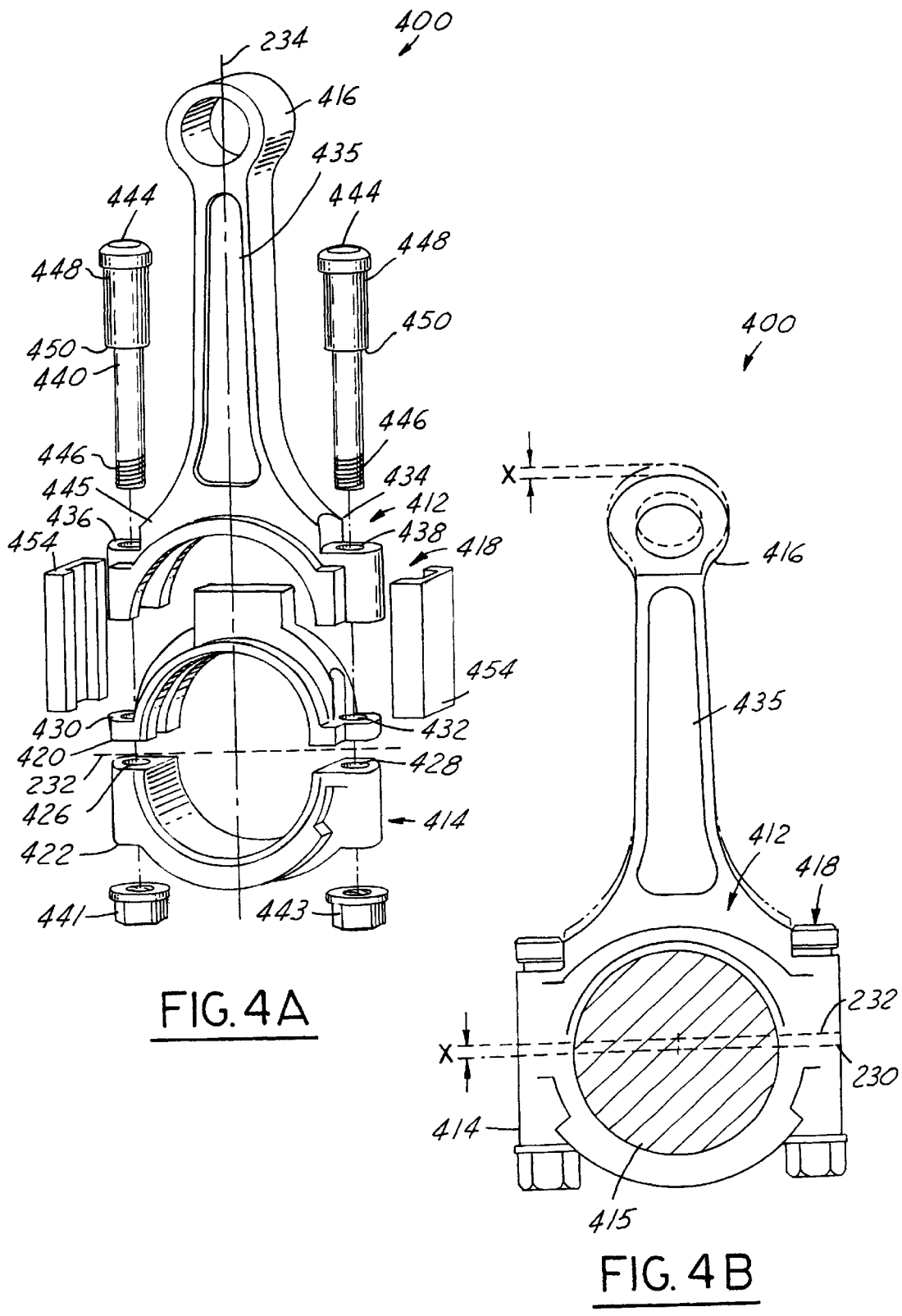

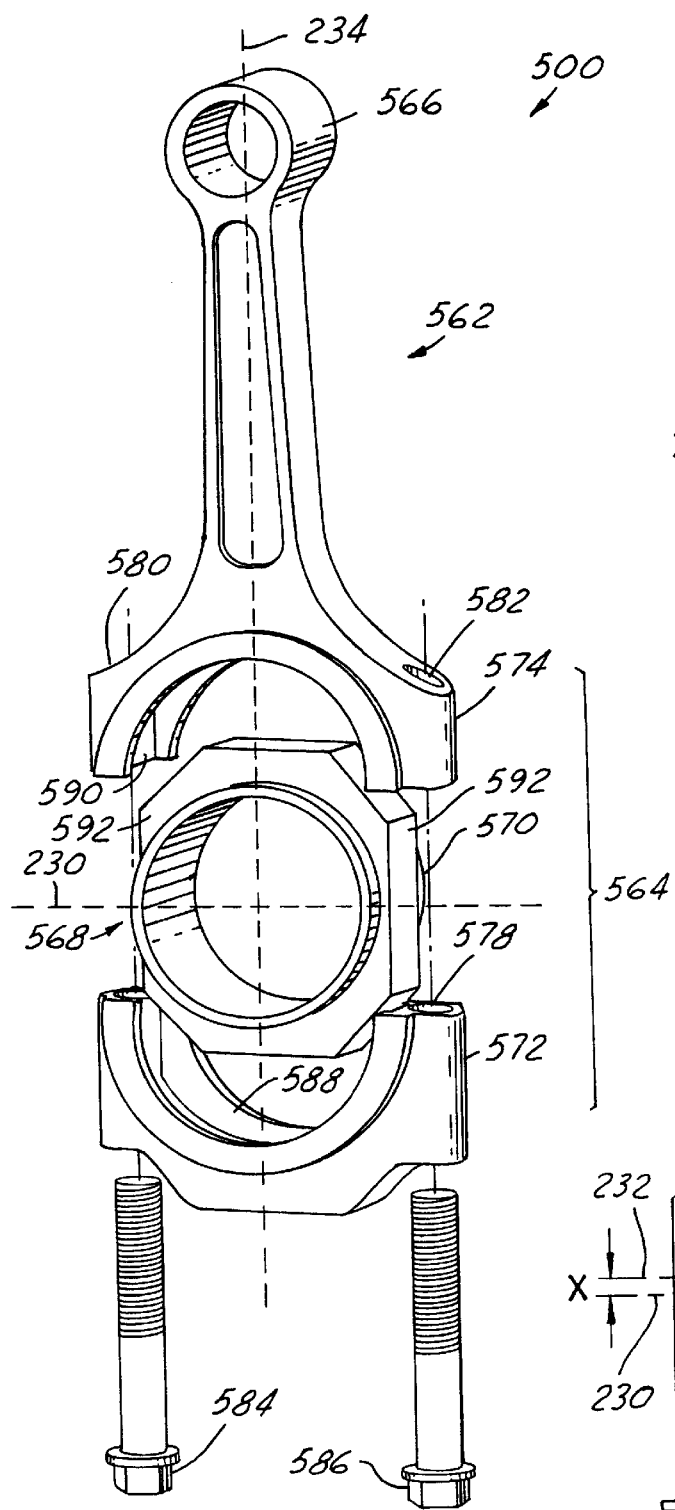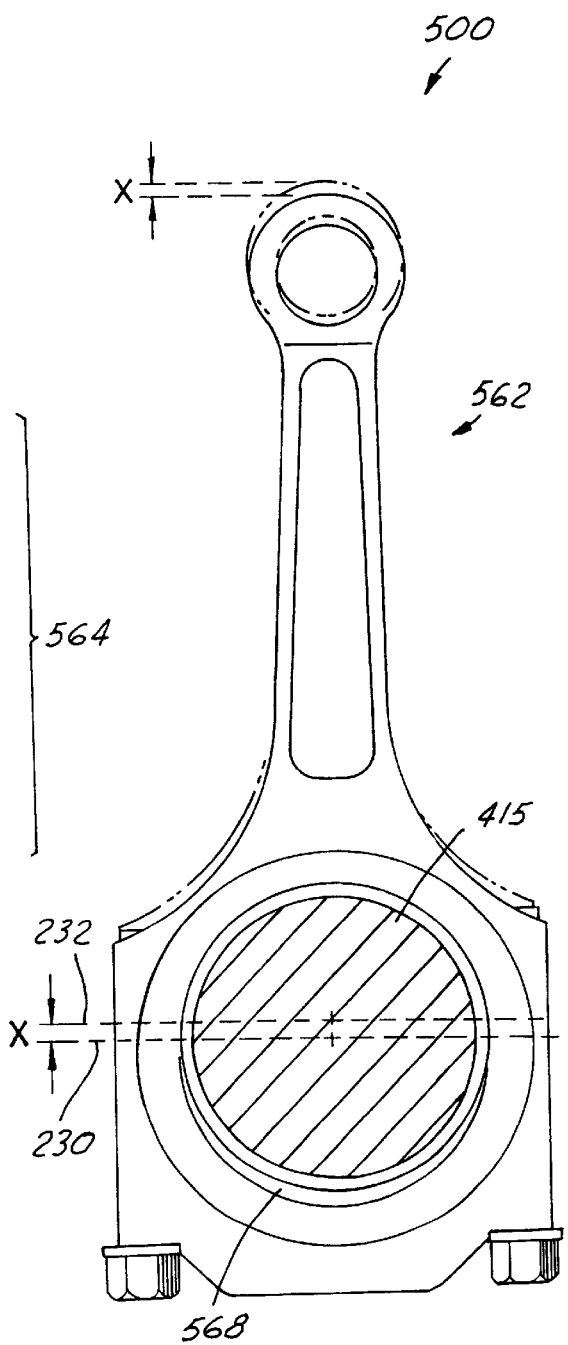
FIG. 5A
FIG. 5B

BASE STATE
(Low Compression Mode)

EXTENDED STATE
(High Compression Mode)

APPARATUS FOR VARYING THE COMPRESSION RATIO OF AN INTERNAL COMBUSTION ENGINE

FIELD OF THE INVENTION

The present invention relates generally to reciprocating piston internal combustion engines. More particularly, the invention relates to a system and method for varying the compression ratio of a reciprocating internal combustion engine.

BACKGROUND OF THE INVENTION

The "compression ratio" of an internal combustion engine is defined as the ratio of the volume in a cylinder above a piston when the piston is at bottom-dead-center (BDC) to the volume in the cylinder above the piston when the piston is at top-dead-center (TDC). The higher the compression ratio, the more the air and fuel molecules are mixed and compressed and the better the efficiency of the internal combustion engine. This in turn results in improved fuel economy and a higher ratio of output energy versus input energy of the internal combustion engine.

In conventional internal combustion engines, however, the compression ratio is fixed and thus the engine efficiency cannot be changed to yield optimal performance. Accordingly, so-called "variable compression ratio" (VCR) internal combustion engines have been developed to vary the clearance volume of a cylinder in order to achieve improved fuel economy and increase engine power performance. Such VCR engines are designed to have a higher compression ratio during low load conditions, and a lower compression ratio during high load conditions. Conventional techniques include using "sub-chambers" and "sub-pistons" to vary the volume of the cylinder, see for example U.S. Pat. Nos. 4,246,873 and 4,286,552; varying the actual dimensions of all or a portion of a piston attached to a fixed length connecting rod, see U.S. Pat. No. 5,865,092; and varying the actual length of the connecting rod itself, see U.S. Pat. Nos. 5,724,863 and 5,146,879.

Other techniques include the use of eccentric rings or bushings either at the lower "large" end of a connecting rod or the upper "small" end of the connecting rod for varying the length of the connecting rod or height of the reciprocating piston. In U.S. Pat. Nos. 5,562,068, for example, a variable compression ratio connecting rod is disclosed wherein the effective length of the rod is varied via an eccentric ring that can be rotated and selectively locked to the crank pin and to the large end of the rod. When a working hydraulic pressure is released, the eccentric ring becomes locked with the crank pin thus resulting in a longer effective rod length and therefore a higher compression ratio mode. When the working hydraulic pressure is applied, the eccentric ring becomes locked with the rod, thus resulting in a shorter effective rod length and therefore a lower compression ratio. Transition from the higher compression ratio mode to the low compression ratio mode, or vice-versa, occurs when the piston is at BDC.

U.S. Pat. No. 5,960,750 similarly discloses a connecting rod having a rotatable eccentric ring in communication with a connecting rod. The connecting rod includes a mechanically actuated locking member for locking the eccentric ring in one of two positions. When actuated in a first direction, the locking member locks the eccentric ring in a position corresponding to a maximum effective length of the connecting rod, i.e., a high compression ratio mode. When actuated in a second direction, the locking member locks the eccentric ring in a position corresponding to a minimum effective length of the connecting rod, i.e., a high compression ratio mode.

U.S. Pat. No. 5,417,185 and Japanese Publication JP-03092552 also disclose eccentric rings, each of the rings however being disposed between the "small" end of a connecting rod and a corresponding piston pin. The rings are used to vary piston height and thus compression ratio.

The eccentric ring devices of the above cited references however are undesirable in that each eccentric ring must be rotated at least 180 degrees before one of the desired operating modes or positions is engaged. Locking of the ring in a proper position may not occur within an optimum period of time, for example during a single engine cycle, thus leaving the effective length of the rod and consequently the compression ratio of the cylinder in an undesired intermediate state. In an alternative embodiment, the '750 device in fact requires a gear pump to assist rotation of the eccentric bushing. The '068 device in addition requires the piston to be at BDC for a transition to occur from high to low compression mode.

Accordingly, the inventors herein have recognized the need to provide an improved variable compression ratio device that can be quickly and reliably transitioned between different compression ratio modes of a variable compression ratio internal combustion engine.

SUMMARY OF THE INVENTION

The aforedescribed limitations and inadequacies of conventional internal combustion engines are substantially overcome by the present invention, in which a compression ratio apparatus is provided for selectively varying a compression ratio of an internal combustion engine. The apparatus includes a bearing retainer disposed between a connecting rod and a corresponding crankpin, the bearing retainer having an inner surface in communication with the crankpin and an outer surface in communication with the connecting rod, the connecting rod being axially movable relative to the bearing retainer along a longitudinal axis of the connecting rod to effect a selective displacement of the connecting rod relative to the bearing retainer, the displacement thereby causing a change in the effective length of the connecting rod and the compression ratio of the internal combustion engine. Preferably, at least one locking mechanism is provided in cooperation with the bearing retainer and the connecting rod for maintaining the connecting rod at a selected position relative to the bearing retainer, the selected position corresponding to a selected compression of the internal combustion engine.

A principal advantage of the above-described compression ratio apparatus is that transitions between two or more compression ratio modes of an internal combustion engine can be accomplished quickly and reliably without requiring the rotation of an eccentric ring member as disclosed by the prior art. Transitions can be completed within a single cycle of the internal combustion engine by allowing the compression ratio apparatus to respond to the inertial forces acting on the connecting rod and piston. Transitions can be further assisted and the connecting rods "locked" into position using a suitable hydraulic or electromechanical system. In a preferred embodiment, the engine's oil system is used to actuate the mechanism to produce a selected compression ratio for the internal combustion engine.

In accordance with a related aspect of the present invention, a reciprocating internal combustion engine is also provided having the above-described compression ratio apparatus.

Further objects, features and advantages of the invention will become apparent from the following detailed description taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein:

FIGS. 4A and 4B are exploded and non-exploded perspective views, respectively, of a connecting rod and variable compression ratio apparatus in accordance with the present invention;

FIGS. 5A and 5B are exploded and non-exploded perspective views, respectively, of a connecting rod and variable compression ratio apparatus in accordance with another preferred embodiment of the present invention;

DETAILED DESCRIPTION OF THE PREFERRED EMBODIMENTS

Figure 1:
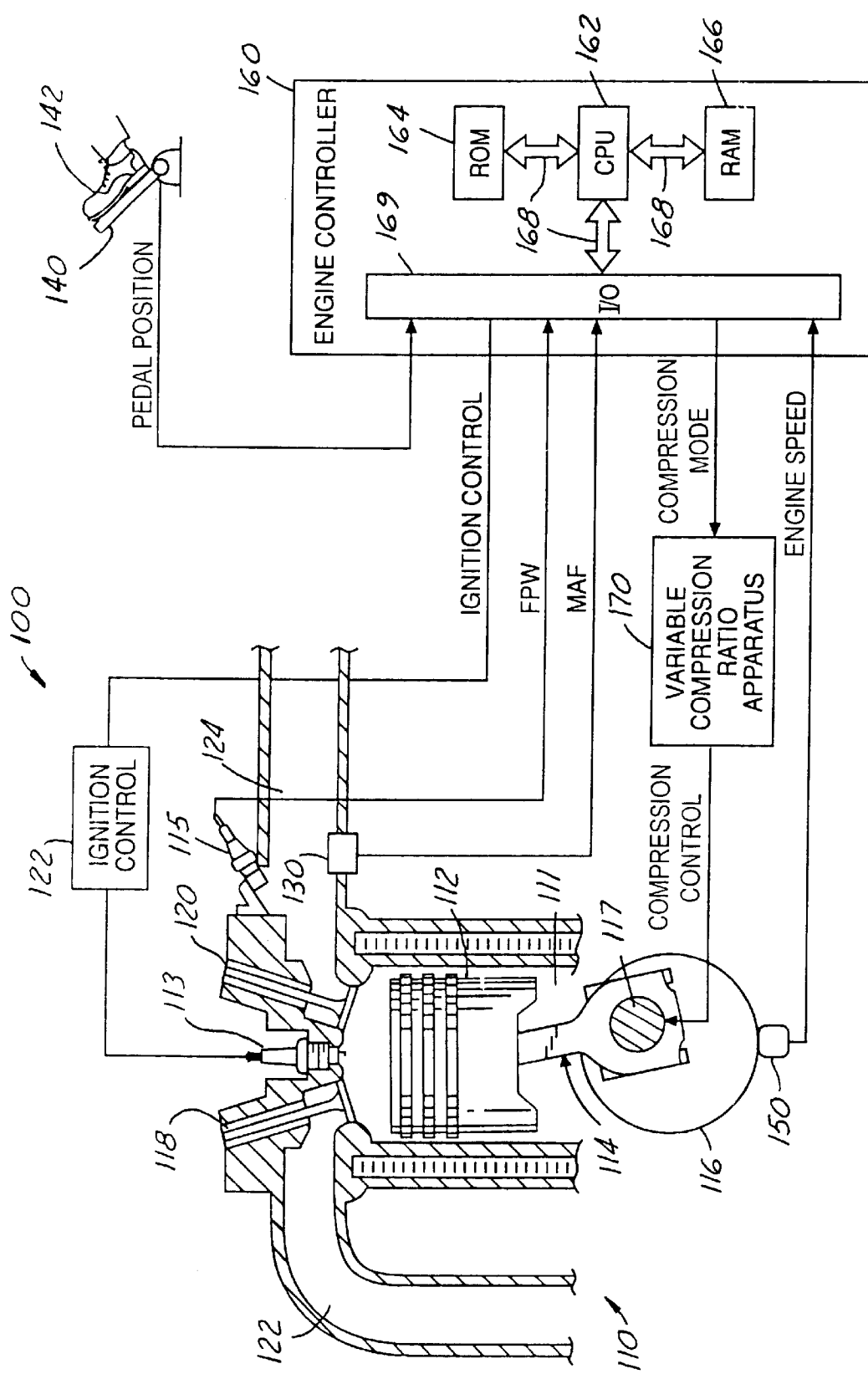
FIG. 1 is a diagram of an exemplary system for varying the compression ratio of an internal combustion engine.

FIG. 1 shows a diagram of a system for operating a variable compression ratio internal combustion engine in accordance with a preferred embodiment of the present invention. The engine 110 shown in FIG. 1, by way of example and not limitation, is a gasoline four-stroke direct fuel injection (DFI) internal combustion engine having a plurality of cylinders (only one shown), each of the cylinders having a combustion chamber 111 and corresponding fuel injector 113, spark plug 115, intake manifold 124, exhaust manifold 132 and reciprocating piston 112. The engine 110, however, can be any internal combustion engine, such as a port fuel injection (PFI) or diesel engine, having one or more reciprocating pistons as shown in FIG. 1. Each piston of the internal combustion engine is coupled to a connecting rod 114 on one end, and to a crankpin 117 of a crankshaft 116. The connecting rod is 114 preferably a fixed-length connecting rod, but is not so limited.

The reciprocating piston 112 is further coupled to a compression ratio mechanism 170 that is operated by an electronic engine controller 160 to vary the compression ratio of the engine. "Compression ratio" is defined as the ratio of the volume in the cylinder 111 above the piston 112 when the piston is at bottom-dead-center (BDC) to the volume in the cylinder above the piston 112 when the piston 112 is at top-dead-center (TDC). Although the compression ratio mechanism 170 is described below as providing "high" and "low" compression ratios, the mechanism 170 can be modified as desired to provide one or more intermediate compression ratios for an internal combustion engine. Accordingly, operation of the mechanism 170 in "high" and "low" compression ratio modes is not intended to limit the scope of the claimed invention.

Figure 11:
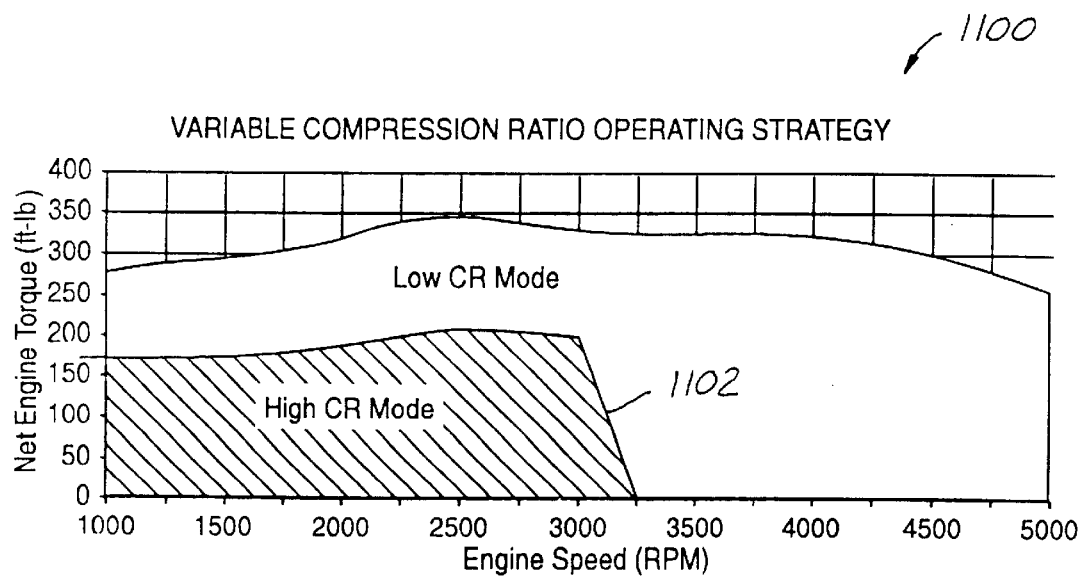
FIG. 11 is a plot showing an exemplary variable compression ratio operating strategy in accordance to a preferred embodiment of the present invention.

Referring again to FIG. 1, the compression ratio mechanism 170 is operated to effect a change in the engine's compression ratio in accordance with one or more parameters, such as engine load and speed, as shown by way of example in FIG. 11. Such parameters are measured by appropriate sensors, such as a speed sensor 150, mass air flow (MAF) sensor 130 and pedal position sensor 140, which are electronically coupled to the engine controller 160. The engine controller 160 includes a central processing unit (CPU) 1162 having corresponding input/output ports 169, read-only memory (ROM) 164 or any suitable electronic storage medium containing processor-executable instructions and calibration values, random-access memory (RAM) 166, and a data bus 168 of any suitable configuration. The controller 160 receives signals from a variety of sensors coupled to the engine 110 and/or the vehicle, and controls the operation of the fuel injector 115, which is positioned to inject fuel into a corresponding cylinder 111 in precise quantities as determined by the controller 160. The controller 160 similarly controls the operation of the spark plugs 113 in a known manner.

Figures 2A, 2B:
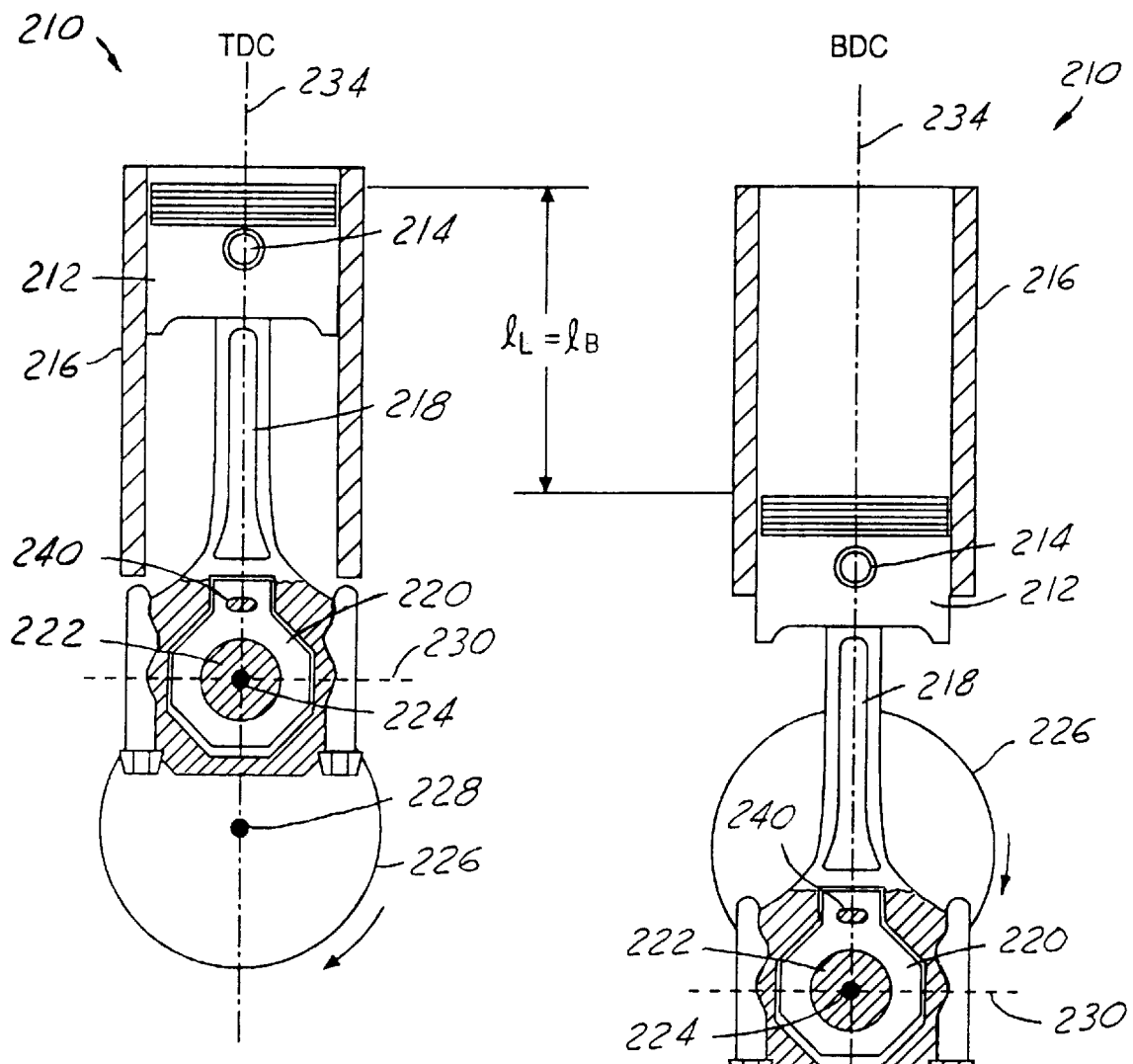
FIGS. 2A and 2B are diagrams showing low compression ratio operation of an internal combustion engine having a variable compression ratio apparatus in accordance with a preferred embodiment of the present invention.
Figures 3A, 3B:
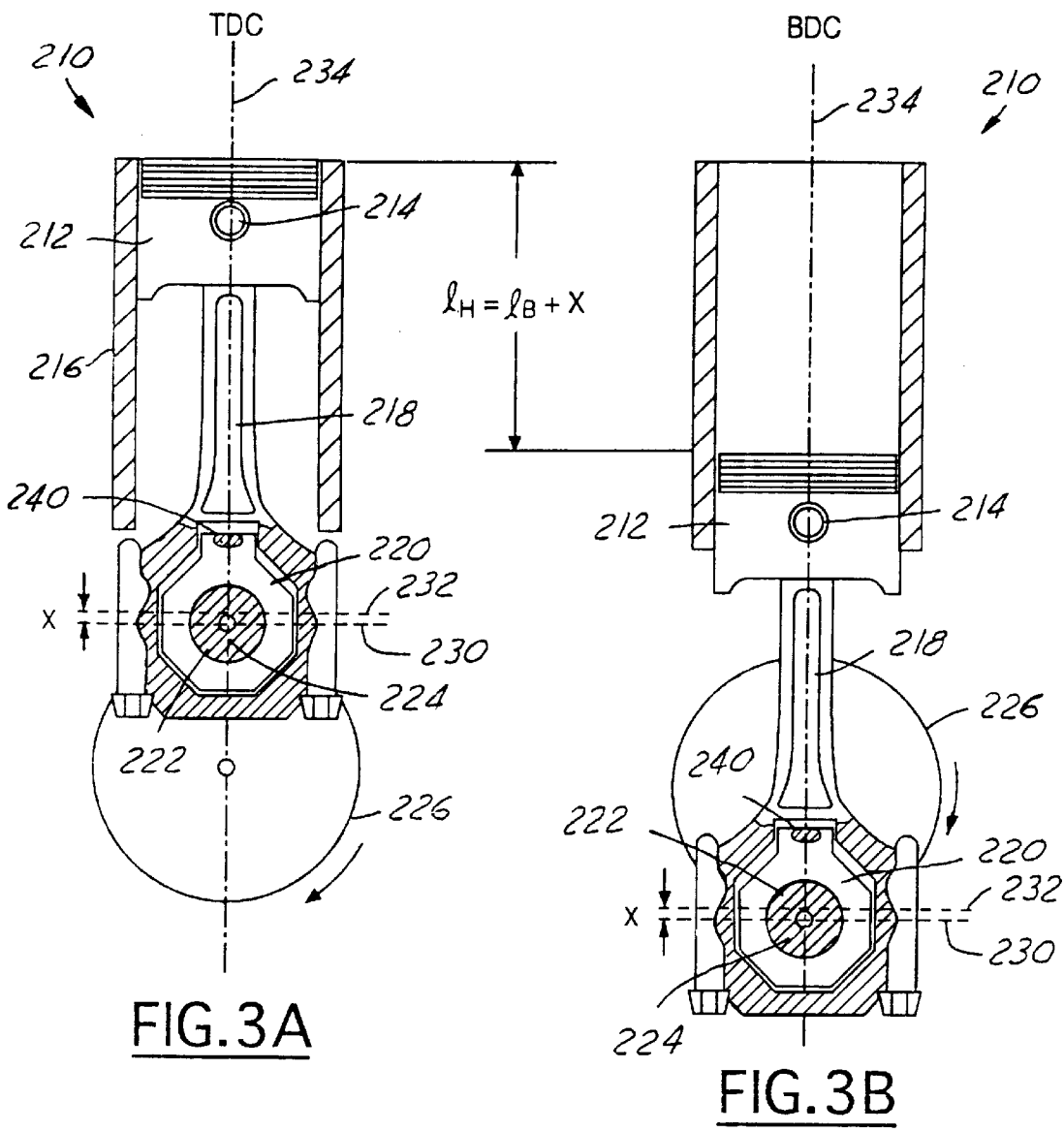
FIGS. 3A and 3B are diagrams showing high compression ratio operation of an internal combustion engine having a variable compression ratio apparatus in accordance with a preferred embodiment of the present invention.

FIGS. 2A through 3B are diagrams illustrating the operation of an internal combustion engine having the variable compression ratio apparatus of FIGS. 2A of the present invention and 2B show the piston 212 top-dead-center (TDC) and bottom-dead-center (BDC) positions, respectively, corresponding to a "baseline" or "unextended" position of a connecting rod 218. The compression mechanism, as shown for example in the cut-away portions of FIGS. 2A an 2B, includes a bearing retainer 220 disposed between the connecting rod 218 and a crankpin 222, the crankpin having a centerline axis 224 extending in and out of the page and parallel to the axis of rotation 228 of a corresponding crankshaft 226. The bearing retainer 220 has a centerline axis 230 normal to the crankpin centerline axis 224, and likewise the connecting rod 218 has a centerline axis (shown as 232 in FIGS. 3A and 3B). When the connecting rod 218 is in the baseline position as shown in FIGS. 2A and 2B, which herein corresponds to a low compression ratio mode of the internal combustion engine, the bearing retainer centerline axis is 230 is coincident or substantially coincident with the connecting rod centerline axis 232. When the connecting rod is in an extended, high compression ratio mode position as shown in FIGS. 3A and 3B, the bearing retainer centerline axis 230 is displaced with respect to centerline axis 232 of the connecting rod.

As such and further shown together FIGS. 4A through 5B, the bearing retainer 220 in accordance with the present invention includes an inner surface in communication with the crankpin 222 and an outer surface in communication with the connecting rod 218. The connecting rod 218 is moveable with respect to the outer surface of the bearing retainer in a linear fashion along a longitudinal axis 234 extending between the first and second ends of the connecting rod 218. The connecting rod centerline axis is thus selectively displaced with respect to the bearing retainer centerline axis, thus causing a change in the effective length of the connecting rod and the compression ratio of the internal combustion engine. Therefore, as illustrated in FIGS. 2A through 3B, the effective length of the connecting rod $l_L$ during low compression ratio operation is equal to the baseline, unextended length $l_B$ of the connecting rod, and the effective length of the connecting rod $l^H$ is equal to the extended length $l_B+x$ of the connecting rod during high compression ratio operation.

FIGS. 4A through 5B show exploded and non-exploded perspective views of preferred embodiments of a connecting rod and compression ratio apparatus in accordance with the present invention. The preferred embodiments are provided by way of example, and are not intended to limit the scope of the invention claimed herein. Further detailed embodiments of the connecting rod and compression ratio apparatus can be found in co-pending U.S. application Ser. Nos. 09/691,668, 09/690,946, 09/691,669, 09/690,950, 09/691,306, 09/691,667, and 09/690,951, all of which are hereby incorporated by reference in their entireties.

Referring to FIGS. 4A and 4B, exploded and non-exploded perspective views are provided, respectively, of a connecting rod and variable compression ratio apparatus in accordance with the present invention. The connecting rod 400 includes a first or so-called "large" end 412 for journaling on a crank pin 415 of a crankshaft and a second so-called "small" end 416 for journaling on a central portion of a wrist pin (not shown) and for coupling the connecting rod 400 to a piston (not shown). A compression ratio apparatus 418 is embodied in the connecting rod at its large end for varying the effective length of the connecting rod as measured between the large and small ends 412 and 416.

In accordance with the present embodiment of FIGS. 4A and 4B, the large end 412 further includes an upper cap 420 and a lower cap 422 that are fastened together around the crank pin 415. Lower cap 22 includes parallel through-holes 426 and 428 at opposite ends of its semi-circumference. At opposite ends of its semi-circumference, upper cap 420 includes through-holes 430 and 432 that align with holes 426 and 427, respectively, when the two caps 420 and 430 are in communication with the crank pin.

Connecting rod 412 further includes a part 434 containing a connecting rod portion 435. One end of part 434 includes the small end 416, and the opposite end is coupled through the compression ratio mechanism 418 with large end 412. The coupling of the compression ratio mechanism and the large end 412 is preferably implemented using through-holes 436 and 438 that align with through-holes 430 and 432, respectively, fasteners 440 and 442, and nuts 441 and 443. Through-holes 436 and 438 are disposed mutually parallel, and are disposed in free ends of curved arms 445 that extend from connecting rod portion 435.

Each fastener 440 and 442 includes a head 444 disposed at a proximal end and a screw thread 446 disposed at a distal end. Intermediate proximal and distal ends, each fastener includes a circular cylindrical guide surface 448. The parts are assembled in the manner indicated by FIG. 4A with the respective fastener shanks passing though respective aligned through-holes 436 and 430, 438 and 432, and 426 and 428; and threading into respective nuts 441 and 443. The diameters of through-holes 436 and 438 are larger than those of through-holes 430 and 432 to allow shoulders 450 at the ends of guides 448 to bear against the margins of through-holes 430 and 432. As the fasteners and nuts are tightened, such as by turning with a suitable tightening tool, the two caps 420 and 422 are thereby forced together at their ends, crushing the crank pin bearing in the process and thereby forming a bearing retainer structure around the crank pin.

The axial length of each guide surface 448, as measured between head 444 and shoulder 450, is slightly greater than the axial length of each through-hole 436 and 438, and the diameters of the latter are slightly larger than those of the former to provide sliding clearance. In this way, it becomes possible for the rod part 434 to slide axially, i.e., the outer surface of the combined 420/430 assembly is axially movable relative to the connecting rod, over a short range of motion relative to the large end 412 along a longitudinal axis 234 extending between the large and small ends of the connecting rod. The range of motion is indicated in FIG. 4B by the displacement x of a connecting rod centerline 232 with respect to a centerline 230 of the assembled caps 420 and 430. The displacement x of the two centerline axes thus translates into a change x in length of the connecting rod assembly 400. When arms 445 abut part 420 around the margins of through-holes 30 and 32, the connecting rod assembly 400 has a minimum or "baseline" length corresponding to a low compression ratio mode of operation for the internal combustion engine. When arms 445 abut heads 444, the connecting rod assembly 400 has a maximum or extended length corresponding to a high compression ratio operation of the internal combustion engine.

As further shown in FIGS. 4A and 4B, channels 454 may be assembled at the sides of the connecting rod assembly 400 to provide additional bearing support for the axial sliding motion of the connecting rod. Mechanism 418 may include passive and/or active elements for accomplishing overall length change, and resulting compression ratio change.

FIGS. 5A and 5B are exploded and non-exploded perspective views, respectively, of another preferred embodiment of a connecting rod and compression ratio mechanism in accordance with the present invention. As shown in FIGS. 5A and 5B, a connecting rod 500 comprises a large end 564 for journaling on a crank pin 415 of a crankshaft (not shown) and a small end 566 for journaling on a central portion of a wrist pin (not shown) for coupling the connecting rod 500 to a piston (not shown). The compression ratio mechanism 568 is embodied in this case entirely within the large end 564 of the connecting rod 500 to provide for variation in the overall length between the large and small ends of the connecting rod.

Mechanism 568 in accordance with the present invention is provided by a single-piece bearing retainer 570 which is captured between a cap 572 and one end of a rod part 574.

Opposite ends of the semi-circumference of cap 572 contain holes 576 and 578 that align with threaded holes 580 and 582 in rod part 574. Fasteners 584 and 586 fasten the cap to the rod part. The cap and rod part have channels 588 and 590 that fit to respective portions of a flange 592 of bearing retainer 570. The channel and flange depths are chosen to allow the assembled cap and rod part to move axially a short distance on the bearing retainer, thereby changing the overall length, as marked by x in FIG. 5B. Mechanism 568 may comprise passive and/or active elements for accomplishing overall length change and corresponding compression ratio change. The channels form the groove, and the flange the tongue, of a tongue-and groove type joint providing for sliding motion that adjusts the length of the connecting rod assembly.

Figure 6A:
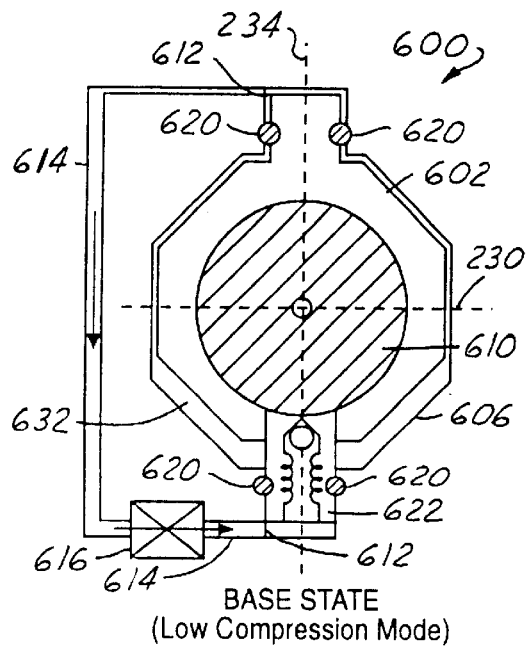
FIGS. 6A and 6B are diagrams showing the operation of an exemplary variable compression ratio apparatus in accordance with a preferred embodiment of the present invention.
Figure 6B:
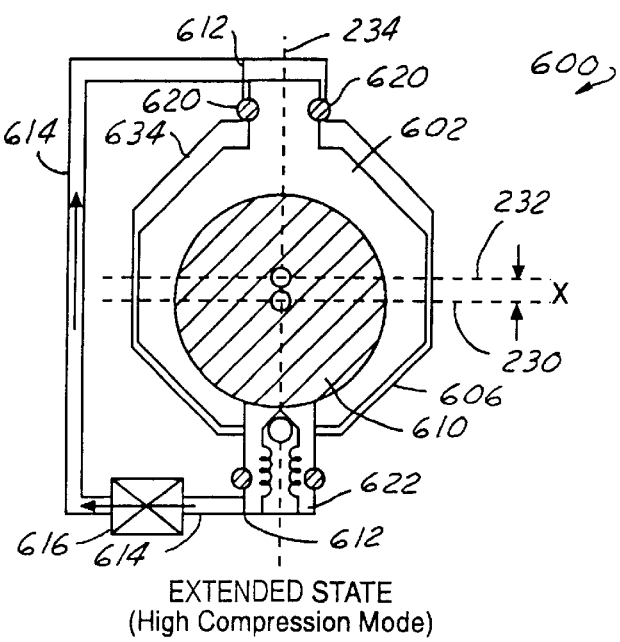

FIGS. 6A and 6B are schematic diagrams showing the operation of an exemplary compression ratio mechanism 600 in accordance with a preferred embodiment of the present invention. In FIGS. 6A and 6B, the compression ratio mechanism 600 includes a unitary bearing retainer 602 having post portions 621 and 622 disposed on opposite ends of the main bearing retainer along the longitudinal axis 234 of the connecting rod. Note, only a cut-out, inner profile 606 of the connecting rod is shown in FIGS. 6A and 6B. When the compression ratio mechanism of the present invention is assembled within the inner profile of the connecting rod, the mechanism is actuated from a low compression ratio position as shown in FIG. 6A to a high compression ratio position as shown in FIG. 6B and vice-versa by actuating the bearing retainer via a hydraulic or electromechanical system coupled to and/or within the connecting rod. A hydraulic system having openings 612 and conduits 614 are provided for enabling the flow of oil or other suitable fluid to and from each of the post regions so as to move the entire bearing retainer from one position to another. A check valve 616 is also provided for controlling the flow of oil used to position the connecting rod relative to the bearing retainer.

In order for the connecting rod to move from an extended state to the baseline state, the rod must be in compression, e.g., during the combustion stroke of a four-stroke internal combustion engine, and the check valve 620 must be positioned so as to allow the flow of oil into the lower reservoir 632 formed between the inside of the connecting rod and the bearing retainer. The check valve allows oil to move from the upper reservoir 634 to the lower reservoir 632. In this manner, the connecting rod is locked in the baseline position until the check valve is moved.

In order for the VCR to move back to the extended position, the rod must be in tension, e.g., during the intake stroke of a four-stroke internal combustion engine, and the check valve 620 must be positioned so as to allow the flow of oil from the lower reservoir 632 to the upper reservoir 634. In this manner, the connecting rod remains locked in the extended, high compression ratio position.

In the present embodiment, a positive oil pressure combined with inertial forces on the connecting rod are used to extend or retract the connecting rod as required to yield the desired compression ratio. Further, the positive oil pressure is used to maintain or "lock" the connecting rod in the desired position. FIGS. 7 through 10 discussed below show alternative embodiments of the compression ratio mechanism having one or more hydraulically or electromechanically actuated locking mechanisms for maintaining the effective length of the connecting rod as required.

Figure 7:
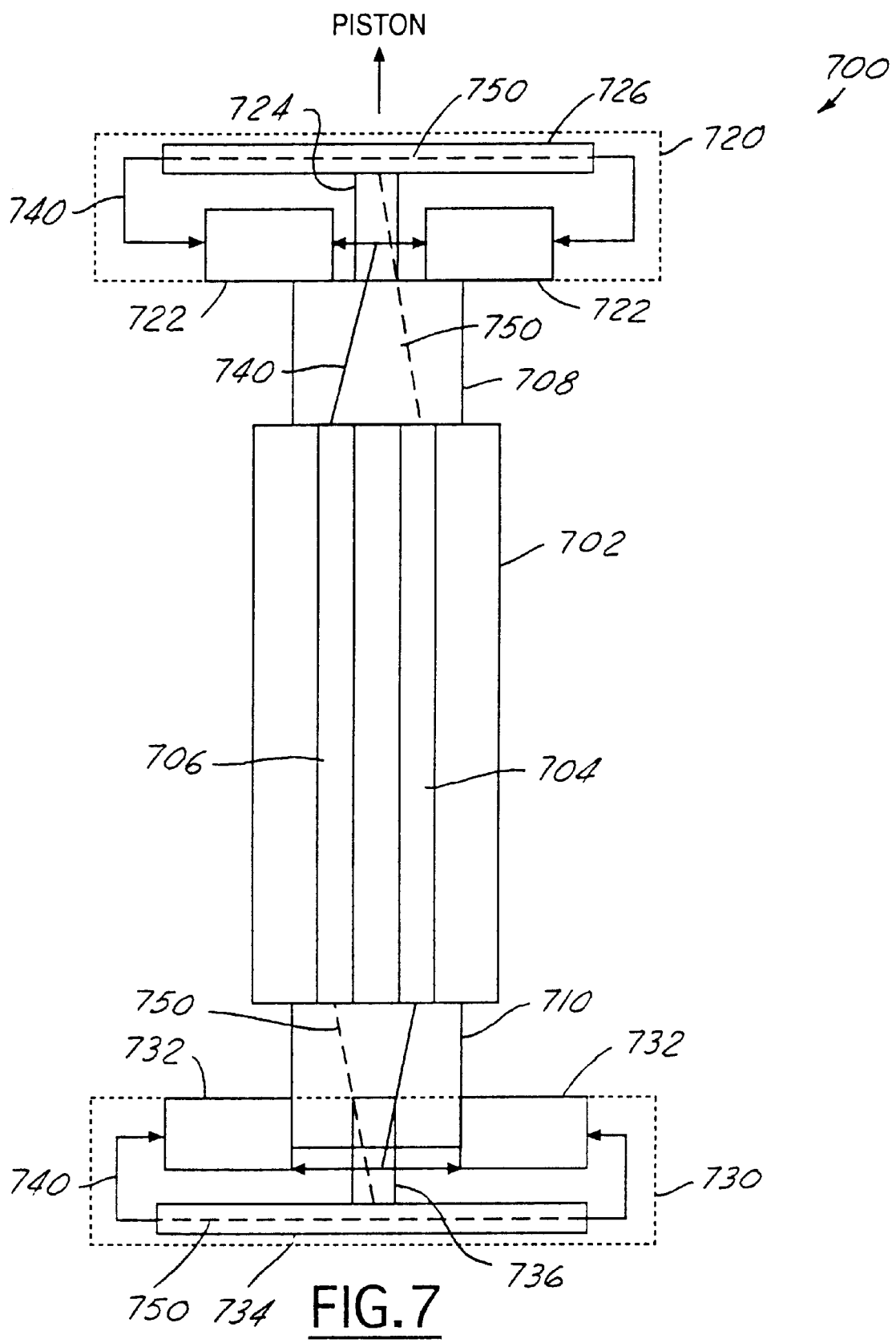
FIG. 7 is a diagram showing the operation of an exemplary variable compression ratio apparatus having two locking mechanisms in accordance with a preferred embodiment of the present.

FIG. 7 is a diagram showing the operation of an exemplary compression ratio apparatus having two locking mechanisms 722 and 732 in accordance with a preferred embodiment of the present. The mechanism further includes a bearing retainer having a main body portion 702 in contact with a corresponding crankpin, an upper post portion 708, a lower post portion 710 and oil conduits 704 and 706 for providing passageways for a high pressure oil line 740 and a low pressure oil line 750. The elements or portions thereof shown within boxes 720 and 730 are preferably housed within the large end of the connecting rod adjacent to the corresponding post portions 708 and 710 of the bearing retainer.

The locking mechanisms shown in FIG. 7 are held in their current positions using the low "lubrication" oil pressure line 750 and transitioned to the next position using the high pressure oil line 740. The high pressure line 740, which is represented in FIG. 7 as a solid line, is used for transitioning the connecting rod to the next position. This is accomplished using high-pressures pulses on the line 740 that cause the elements of the locking mechanisms 722 and 732 either to compress or move part so as to allow compression or tension forces on the connecting rod to transition the rod to a high compression ratio mode position or low compression ratio mode position. The low oil pressure line 750, in contrast, is used to maintain the locking pins 722 and 732 in their positions after corresponding high-pressure pulses have been provided to displace the centerline axis of the connecting rod. Preferably, a single high-pressure pulse on high pressure line 740 causes the lockpin already in the "locked" position, for example mechanism 722 shown in FIG. 7, to expand and thus unlock while at time causing the opposing lock mechanism 732 to compress and remain in a locked position after the connecting rod shifts in the direction away from the piston. As shown in FIG. 7, the operation of the compression ratio apparatus thus corresponds to a transition from high compression ratio mode to low compression ratio mode.

Note, as with all of the preferred embodiments of the present invention, is understood that the compression ratio apparatus of the present invention can be adapted accordingly to transition between more than two compression ratio states. For example, the compression ratio apparatus can be designed accordingly to transition between three or more compression ratio states, i.e., high, medium and low compression ratio states.

Figure 8:
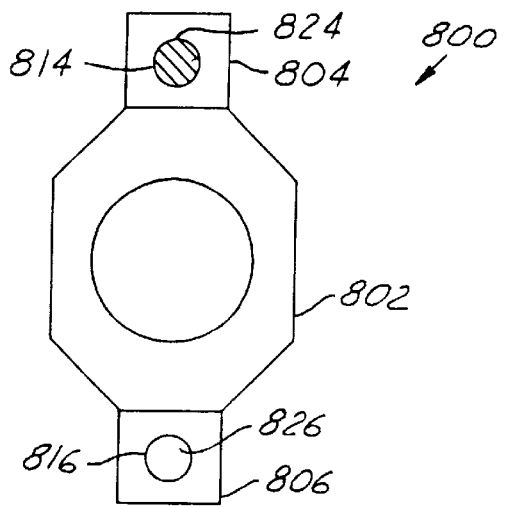
FIG. 8 is a diagram of an exemplary variable compression ratio apparatus having two opposing locking mechanisms and corresponding through-holes.
Figure 9A:
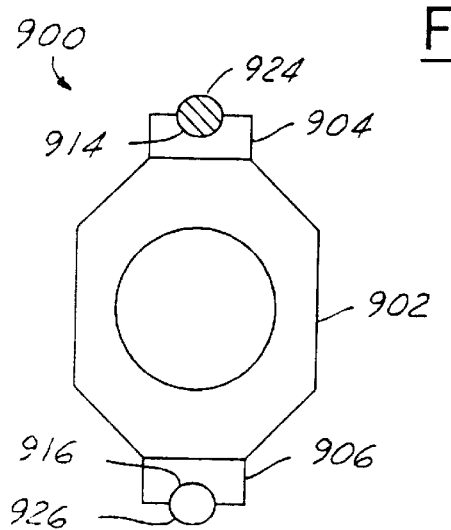
FIGS. 9A and 9B are diagrams of exemplary variable compression ratio apparatuses having two opposing locking mechanisms and corresponding channels.
Figure 9B:
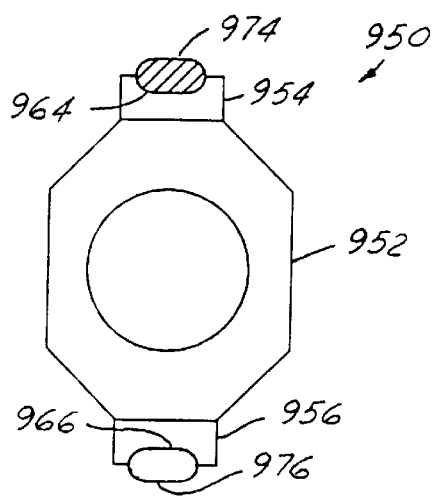
Figure 10:
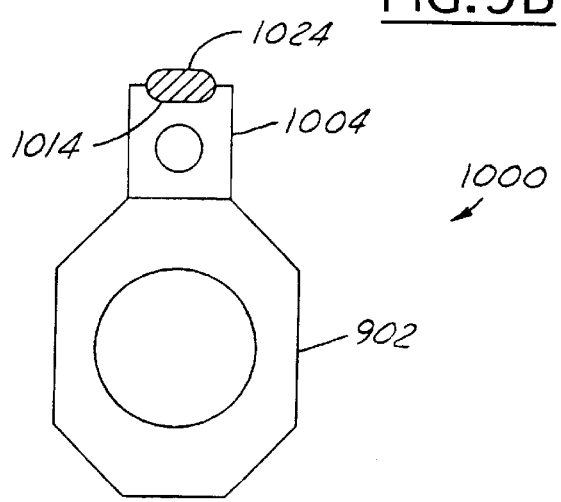
FIG. 10 is a diagram of an exemplary variable compression apparatus having a single locking mechanism and a corresponding channel.

FIGS. 8 through 10 show alternative embodiments of the locking mechanisms for the compression ratio apparatus of the present invention. FIG. 8 is a diagram of an exemplary variable compression apparatus having two opposing locking mechanisms 824 and 826 and corresponding through-holes 814 and 816 formed through post portions 804 and 806. Lock mechanism 814, shown in FIG. 8 as a shaded region, is shown to be in a locked position. Preferably, both mechanisms are cylindrically shaped pins suitably designed to withstand the inertial forces exerted via the connecting rod during operation of the engine.

FIG. 9A shows a similar embodiment as shown in FIG. 8 except that locking mechanisms 924 and 926 are arranged and constructed to cooperate with corresponding channels 914 and 916 formed on the upper and lower sides of the post portions 904 and 906, respectively. An additional embodiment is also shown in FIG. 9B, except that the locking mechanisms are flattened cylindrical pins 974 and 976 having correspondingly shaped channels 964 and 966 formed on post portions 954 and 956. FIG. 10 shows an embodiment similar to the embodiment of FIG. 9B except that only one post 1004 and corresponding locking mechanism/channel 1024/1014 are provided.

FIG. 11 is a plot showing an exemplary compression ratio map 1100 for use with the various compression ratio apparatuses described above. The map 100 shows the operating strategy for a variable compression ratio internal combustion engine, and is implemented in accordance with a preferred embodiment of the present invention by the electronic engine controller of FIG. 1. The mapping, which is embodied in computer readable program code and corresponding memory means, is used to operate an internal combustion engine in accordance with high and low compression ratio modes 1102 and 1104, respectively, depending on the detected operating speed and load of the internal combustion engine. The mapping determines when the compression modes are to be switched, and is provided solely by way of example and is intended to limit the scope of the present invention in any way.

Figure 12:
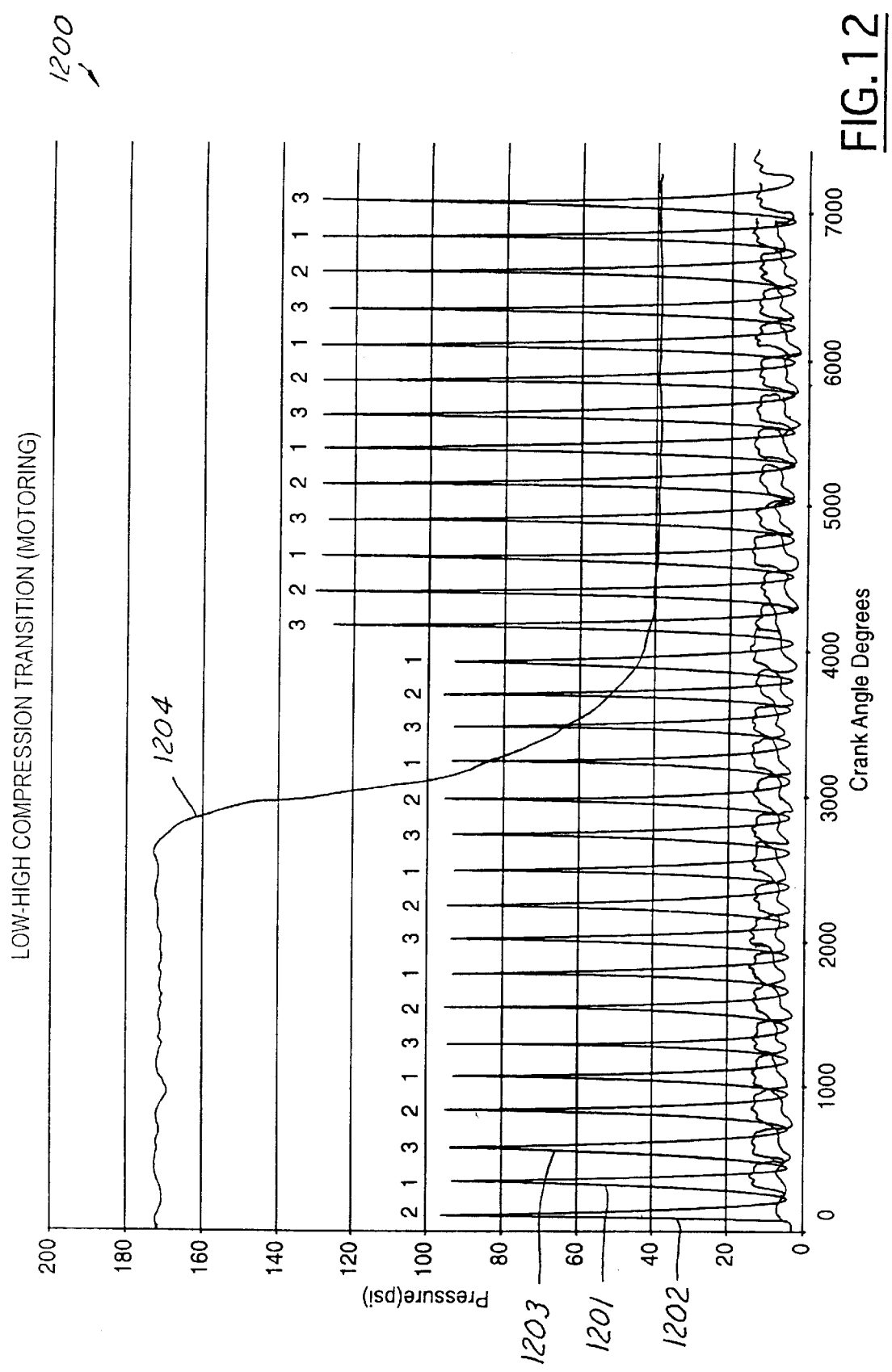
FIGS. 12 and 13 are plots of cylinder and oil pressure versus crank angle degrees during the motoring of an exemplary variable compression ratio internal combustion engine arranged and constructed in accordance with the present invention.
Figure 13:
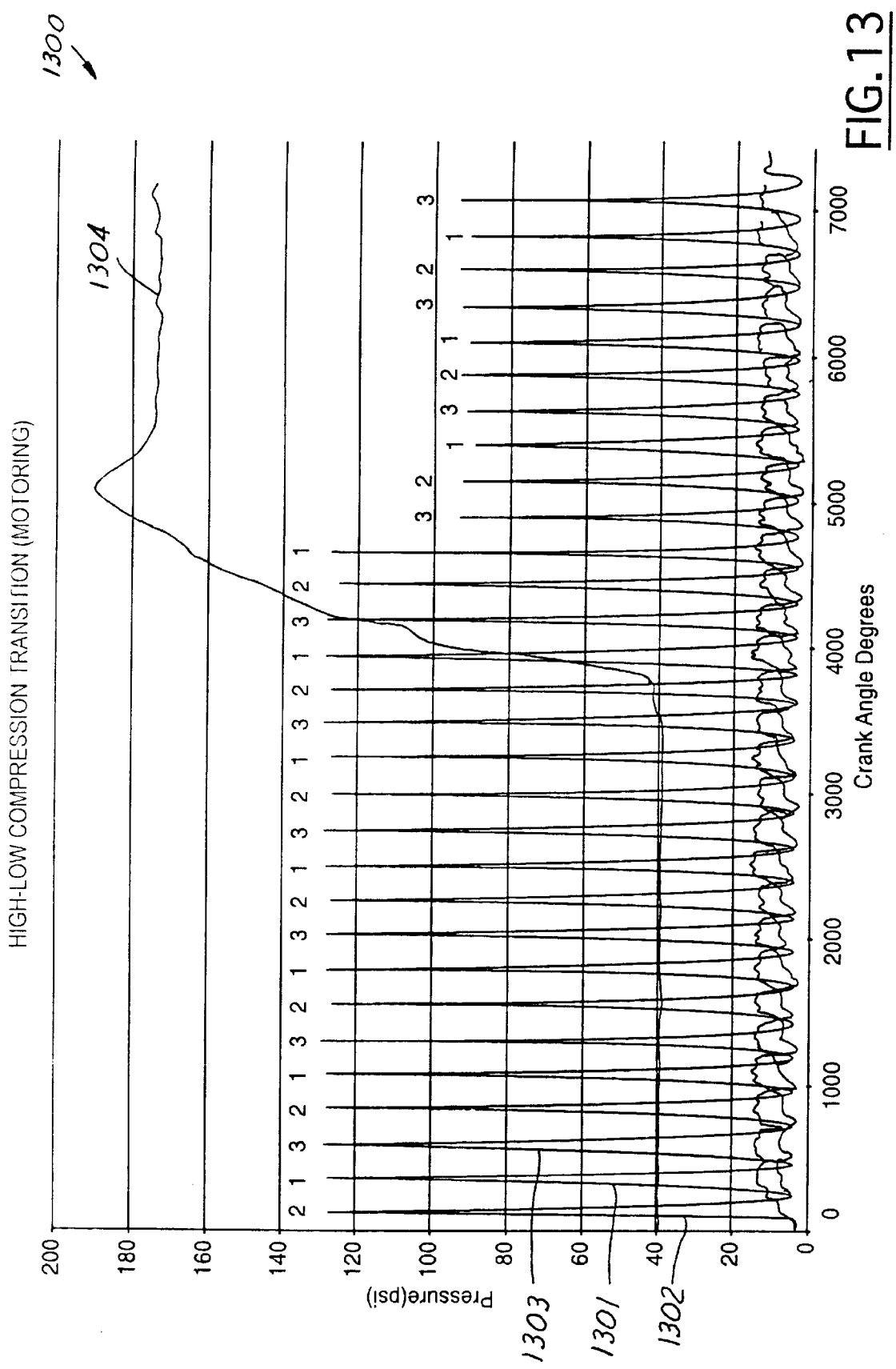
Figure 14:
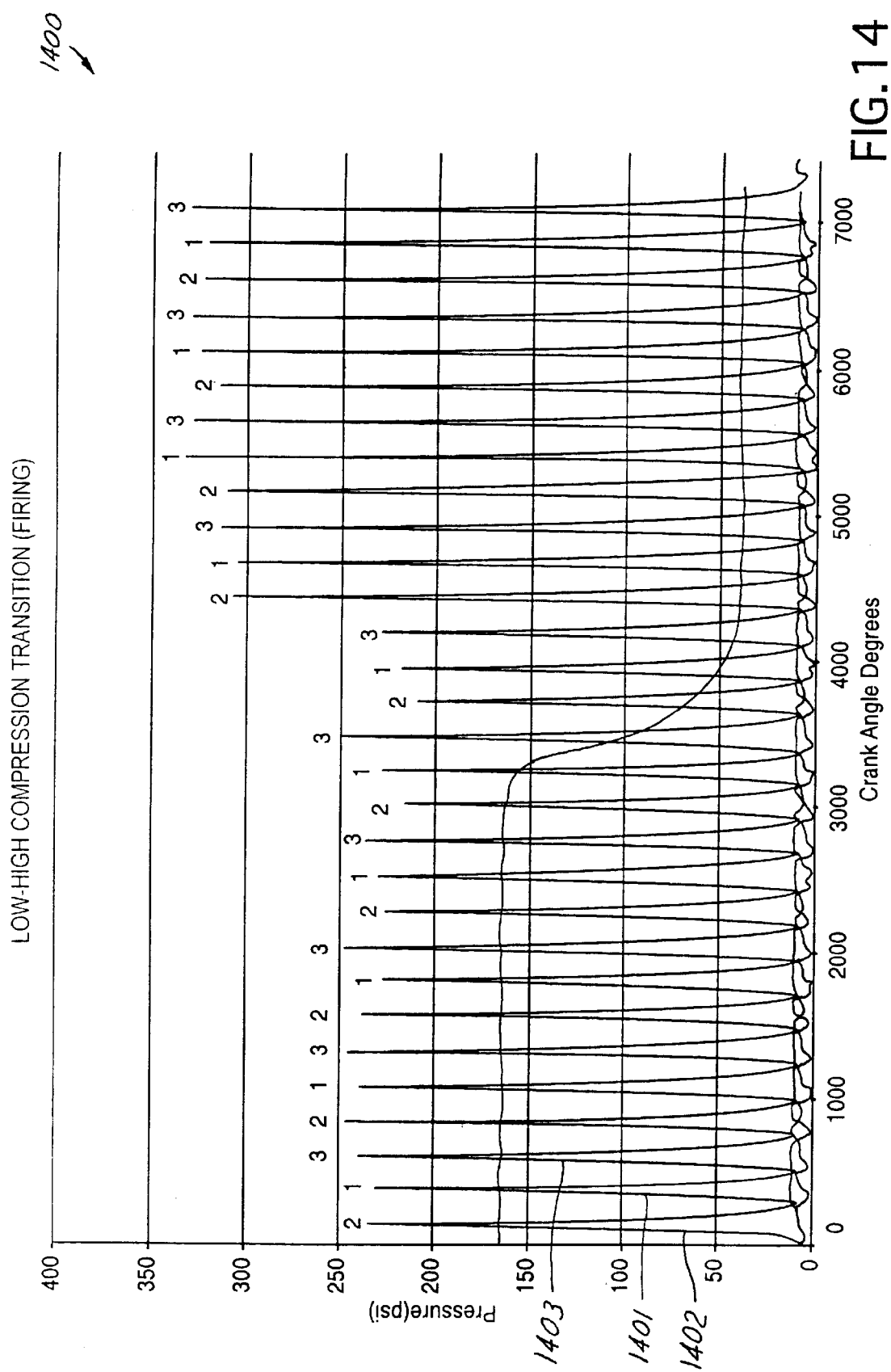
FIGS. 14 and 15 are plots of cylinder and oil pressure versus crank angle degrees during the firing of an exemplary variable compression ratio internal combustion engine arranged and constructed in accordance with the present invention.
Figure 15:
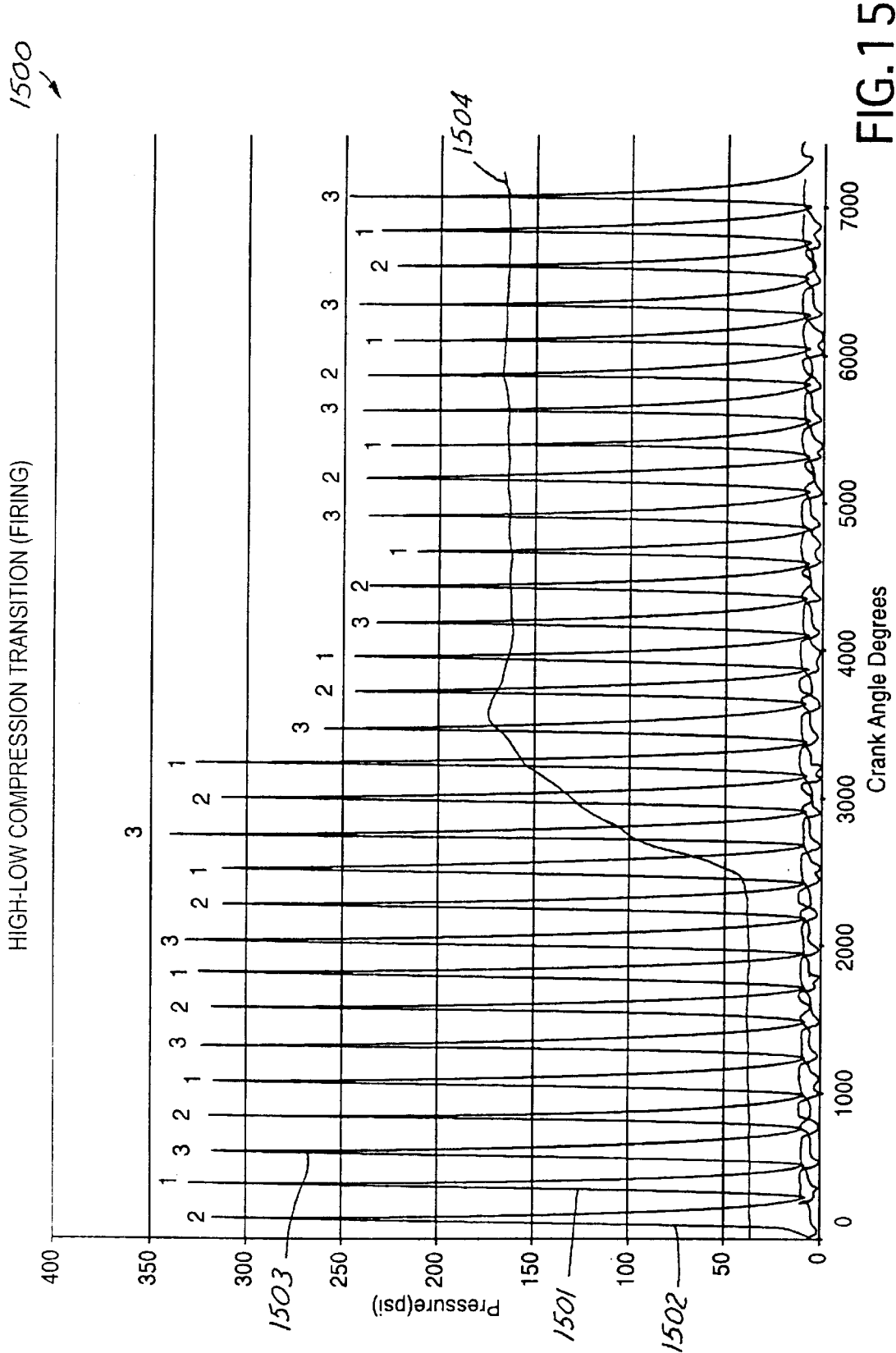

FIGS. 12 through 15 are plots of cylinder and oil pressure versus crank angle degrees for a three-cylinder, four-stroke variable compression ratio gasoline internal combustion engine. FIGS. 12 and 13 correspond to low-to-high and high-to-low compression mode transitions, respectively, and show plots of cylinder and oil pressure during motoring. FIGS. 14 and 15 also correspond to low-to-high and high-to-low compression mode transitions, respectively, and show plots of cylinder and oil pressure during firing. All of FIGS. 12 through 15 show pressure plots 1201–1203, 1301–1303, 1401–1403 and 1501–1503 for each of the cylinders (plots also labeled "1", "2" and "3") and "galley" oil pressure plots 1204, 1304, 1404 and 1504. Operating conditions include a nominal engine speed of 1500 rpm (1500 rpm, 2.62 bar brake mean effective pressure (BMEP) for firing cylinders) with an oil temperature of approximately 120 degrees F. and an engine coolant temperature of approximately 150 degrees F.

The plots 1200 through 1500 shown in FIGS. 12 through 15 correspond to an engine having compression ratio apparatuses requiring a relatively high oil pressure, nominally greater than 100 psi, for maintaining the connecting rods in a low compression ratio operating mode, and a relatively low oil pressure, nominally less than 100 psi, for maintaining the connecting rods in a high compression ratio operating mode. The actual values of the oil pressure levels and relation to compression ratio modes however is not intended to limit the scope of the present invention. As indicated by the plots, once the galley oil pressure reaches a threshold level, the connecting rods transition within a single engine cycle to the commanded position. The transitions in FIGS. 12 and 14 result in high compression mode operation, and the transitions in FIGS. 13 and 15 result in low compression mode operation.

Accordingly, preferred embodiments of a compression ratio apparatus have been described having a bearing retainer in cooperation with a connecting rod wherein the centerline axis of the connecting rod is displaced quickly and reliably with respect to the centerline axis of the bearing retainer to effect a change in the length of the connecting rod, thereby selectively causing a change in the compression ratio of the internal combustion engine. The transition from one compression ratio mode to another is accomplished in a linear fashion without requiring the rotation of an eccentric ring member as shown by the prior art. The compression ratio can be actuated in accordance with any suitable control strategy using a suitable hydraulic or electromechanical system. In a preferred embodiment, the engine's oil system is used to actuate the mechanism to produce a selected compression ratio for the internal combustion engine.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. An apparatus for selectively varying a compression ratio of an internal combustion engine, the engine having a cylinder, a reciprocating piston disposed within the cylinder, a crankshaft having a crankpin, and a connecting rod coupled to the crankpin and the piston, said apparatus comprising a bearing retainer disposed between the connecting rod and the crankpin, the bearing retainer having an inner surface in communication with the crankpin and an outer surface in communication with the connecting rod, the connecting rod being axially movable relative to the bearing retainer along a longitudinal axis of the connecting rod to effect a selective displacement of the connecting rod relative to the bearing retainer, the displacement thereby causing a change in the effective length of the connecting rod and the compression ratio of the internal combustion engine.

2. The apparatus according to claim 1, wherein said apparatus is operable to vary the effective length of the connecting rod accordingly to configure the engine in a plurality of compression ratio modes.

3. The apparatus according to claim 1, wherein said apparatus is operable to vary the effective length of the connecting rod accordingly to configure the engine in a first compression ratio mode.

4. The apparatus according to claim 1, wherein said apparatus is operable to vary the effective length of the connecting rod accordingly to configure the engine in a second compression ratio mode.

5. The apparatus according to claim 1, wherein the displacement in a first direction along the longitudinal axis of the connecting rod corresponds to a first compression ratio mode of the engine.

6. The apparatus according to claim 1, wherein the displacement in a second direction along the longitudinal axis of the connecting rod corresponds to a second compression ratio mode of the engine.

7. The apparatus according to claim 1, further comprising at least one locking mechanism in cooperation with said bearing retainer and the connecting rod for maintaining the connecting rod at a selected position relative to the bearing retainer, the selected position corresponding to a selected compression of the internal combustion engine.

8. A reciprocating internal combustion engine having a cylinder, a piston disposed within the cylinder, a crankshaft having a crankpin, and a connecting rod coupled to the crankpin and the piston, the engine comprising a compression ratio apparatus, said compression ratio apparatus itself comprising a bearing retainer disposed between the connecting rod and the crankpin, the bearing retainer having an inner surface in communication with the crankpin and an outer surface in communication with the connecting rod, the connecting rod being axially movable relative to the bearing retainer along a longitudinal axis of the connecting rod to effect a selective displacement of the connecting rod relative to the bearing retainer, the displacement thereby causing a change in the effective length of the connecting rod and the compression ratio of the internal combustion engine.

9. The engine according to claim 8, wherein said compression ratio apparatus is operable to vary the effective length of the connecting rod accordingly to operate the engine in a plurality of compression ratio modes.

10. The engine according to claim 8, wherein said apparatus is operable to vary the effective length of the connecting rod accordingly to configure the engine in a first compression ratio mode.

11. The engine according to claim 8, wherein said apparatus is operable to vary the effective length of the connecting rod accordingly to configure the engine in a second compression ratio mode.

12. The engine according to claim 8, wherein the displacement in a first direction along the longitudinal axis of the connecting rod corresponds to a first compression ratio mode of the engine.

13. The engine according to claim 8, wherein the displacement in a second direction along the longitudinal axis of the connecting rod corresponds to a second compression ratio mode of the engine.

14. The engine according to claim 8, further comprising at least one locking mechanism in cooperation with said bearing retainer and the connecting rod for maintaining the connecting rod at a selected position relative to the bearing retainer, the selected position corresponding to a selected compression of the internal combustion engine.

\* \* \* \* \*